Nov. 28, 1939.  E. G. SIMPSON ET AL  2,181,671
SEAT ADJUSTER
Filed June 25, 1935   5 Sheets-Sheet 1

INVENTORS.
EMORY GLENN SIMPSON
EDWIN L. GRAF
BY
ATTORNEYS

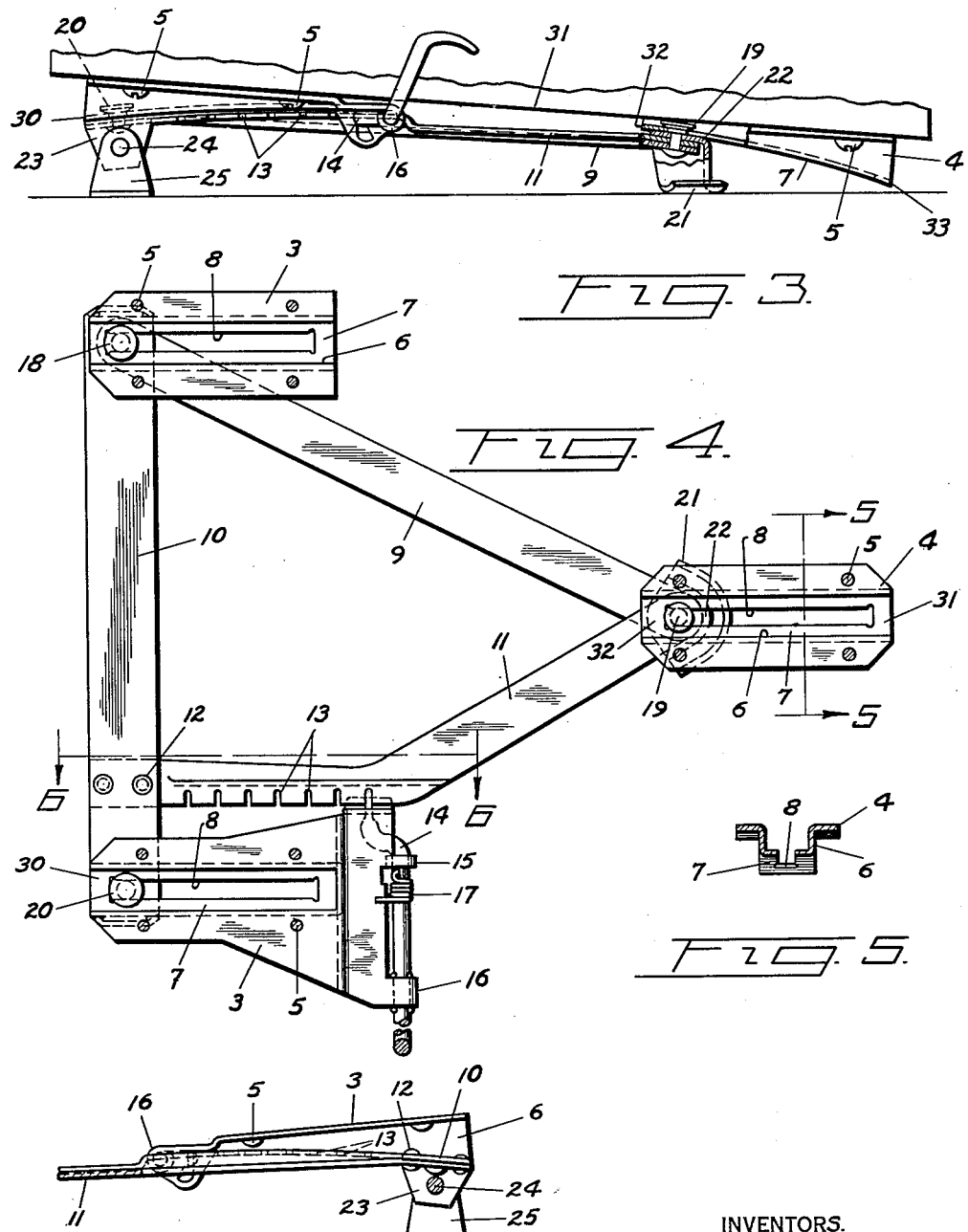

Nov. 28, 1939.  E. G. SIMPSON ET AL  2,181,671
SEAT ADJUSTER
Filed June 25, 1935   5 Sheets-Sheet 4
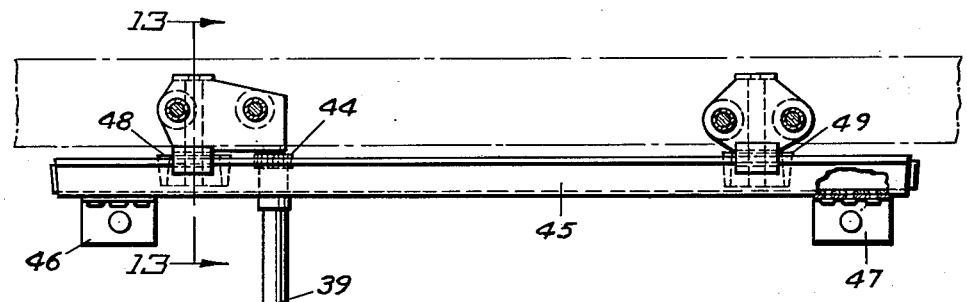
Fig. 12.
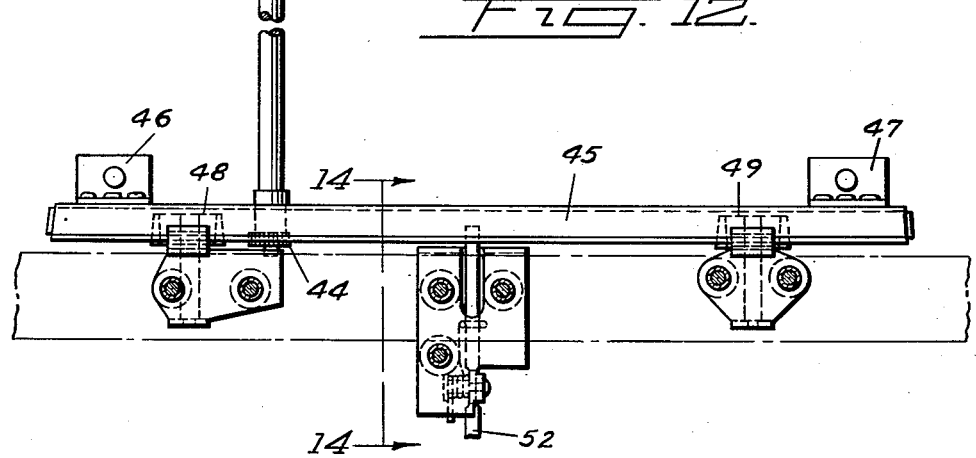
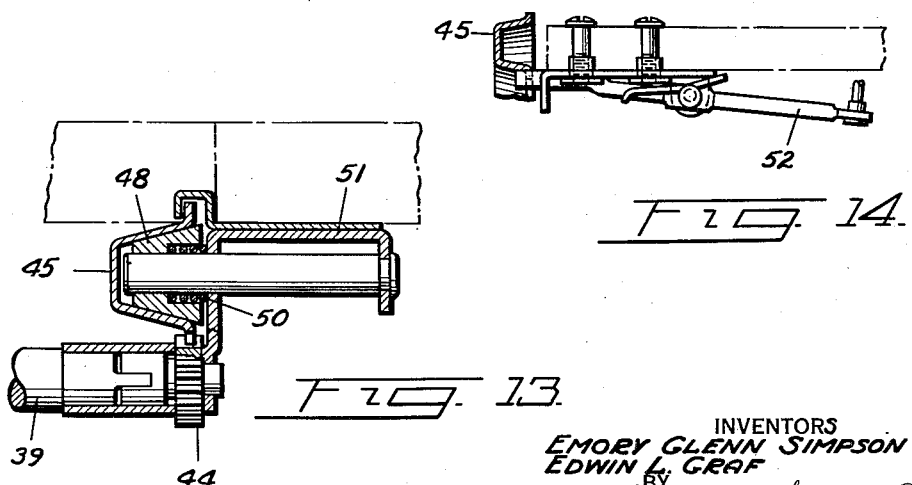
Fig. 14.
Fig. 13.
INVENTORS
EMORY GLENN SIMPSON
EDWIN L. GRAF
BY
Barnes, Kisselle, Laughlin & Raisch
ATTORNEYS

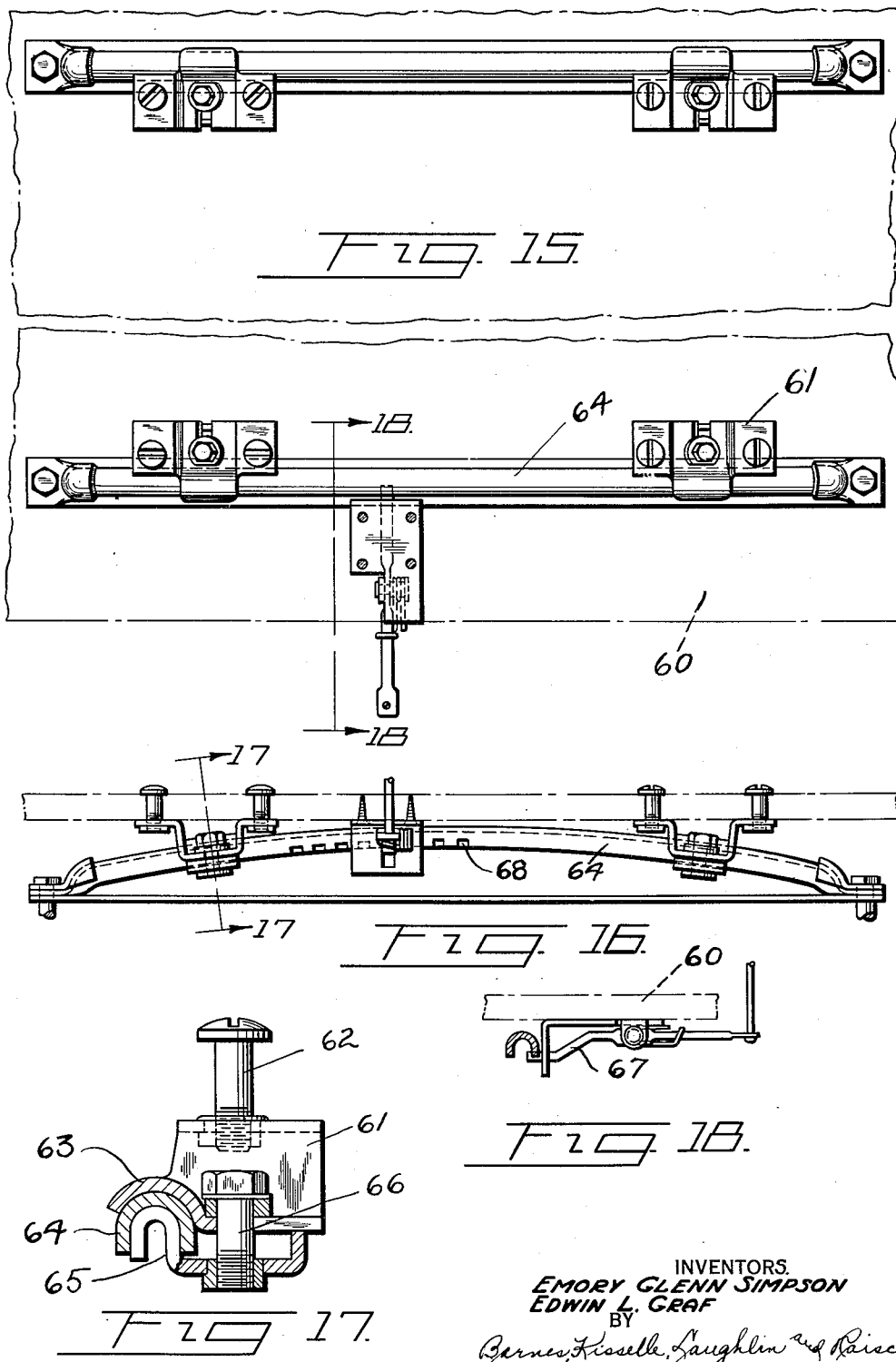

Patented Nov. 28, 1939

2,181,671

UNITED STATES PATENT OFFICE 2,181,671

SEAT ADJUSTER

Emory Glenn Simpson and Edwin L. Graf, Detroit, Mich., assignors to Ternstedt Manufacturing Company, Detroit, Mich., a corporation of Michigan Application June 25, 1935, Serial No. 28,327

3 Claims. (Cl. 155—14)

This invention relates to a seat adjuster and more particularly to a seat adjuster for an automotive vehicle.

It is the object of this invention to produce a seat adjuster that will better adapt itself to the individual requirements of the passenger or driver, regardless of whether he is short or tall, large or small, than those seat adjusters heretofore known. This object is obtained by a seat adjuster which, upon moving the seat forwardly, will lower the front portion and raise the rear portion of the seat cushion, throw the seat back forwardly, and which, when the seat is moved rearwardly, will adjust the seat cushion and back vice versa. More particularly this object is obtained by adjusting the seat along an arc of a true circle in its forward and rearward movement.

In the drawings:

Fig. 3 is a side elevation of the seat adjuster.

Fig. 4 is a top plan view of the adjuster.

Fig. 5 is a section along the line 5—5 of Fig. 4.

Fig. 6 is a sectional view along the line 6—6 of Fig. 4.

Fig. 12 is a fragmentary top plan view of the same.

Fig. 13 is a section on the line 13—13 of Fig. 12.

Fig. 14 is a section on the line 14—14 of Fig. 12.

Figs. 15 and 16 are plan and side views respectively of a modified form of the seat adjuster.

Figs. 17 and 18 are details of the same.

Figure 1:
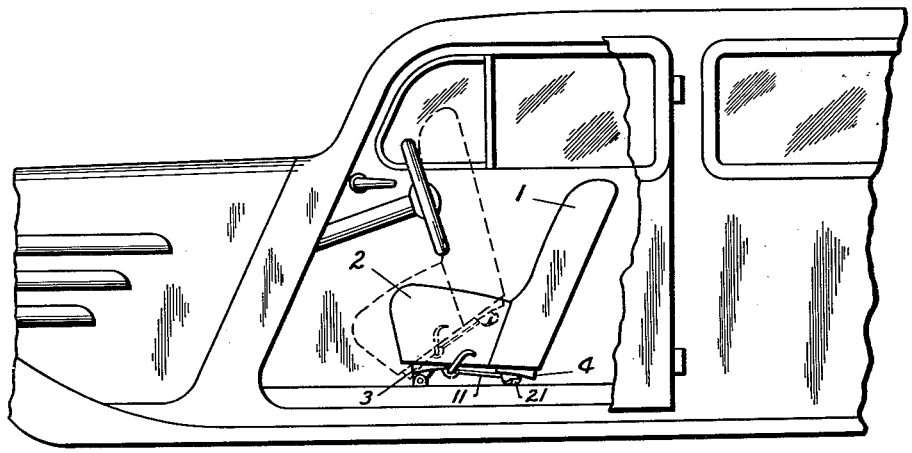
Fig. 1 is a fragmentary view of an automotive vehicle with part of the door broken away showing the seat in its rearmost position in the full lines and in the dotted lines showing the seat tilted forwardly to facilitate the entry and exit of rear seat passengers.

Referring more particularly to the drawings, there is shown a seat having a back portion 1 and a seat cushion portion 2. Preferably the back 1 is rigidly fixed to the seat cushion 2.

This seat adjuster comprises a pair of front slide plates 3 and a rear slide plate or brackets 4, all of which are secured to the seat bottom 31 by the screws 5. The plates or brackets 3 and 4 are each provided with a central longitudinal channel portion 6, the bottom wall 7 of which is curved fore and aft preferably along the arc of a true circle. The bottom walls 7 are each provided with a longitudinal extending slot 8. The slide plates 3 and 4 are secured to the seat bottom so that the bottom walls 7 of the channels 6 are concentric, that is, swing about the same center.

The front slides 3 are mounted oppositely from the rear slide 4, that is, the front end 30 of the bottom wall 7 of each slide plate 3 is spaced from the bottom of the seat and as one travels from the front end 30 to the rear of the arcuate wall 7 the wall gradually approaches the seat bottom 31. On the other hand, the arcuate wall 7 of the rear slide plate 4 has its front end 32 positioned close to the seat bottom 31 and as one travels from the front end 32 to the rear the arcuate wall 7 gradually recedes from the seat bottom 31 and is spaced the greatest distance from the seat bottom at its rear end as at 33. The seat bottom preferably is mounted so that it is tangent to the circle running through arcuate walls 7 at a point approximately midway of the distance between the front end of plate 3 and the rear end of plate 4.

The plates 3 and 4 constitute the upper portion of the seat adjuster which moves forwardly and rearwardly with the seat. The lower portion of the seat adjuster comprises a triangular frame consisting of braces or arms 9, 10 and 11. The brace 11 is provided with a plurality of notches 13 to form a latching rack. The forward end of brace 11 is riveted as at 12 to brace 10 inwardly of the end of the brace 10 and of the plate 3.

One plate 3 carries a latching pawl 14. The left hand slide plate 3 is provided with lugs 15 and 16 in which the latching pawl 14 is journaled. A torsion spring 17 is mounted on the pawl 14 to yieldably hold the pawl in latching engagement with the rack brace 11.

The forward end of the brace 9 is secured to the right hand end of the brace 10 by the rivet 18 which has an enlarged head. The other end of the brace 9 is secured to the rack brace 11 by the rivet 19 which also has an enlarged head. The left hand end of the front brace 10 has fixed thereto the rivet 20 having an enlarged head. The rivets 18, 19 and 20 slidably engage the plates 3 and 4 in the slots 8 to slidably affix the top portion of the seat adjuster to the bottom portion. The front and rear ends of the slots 8 are closed thus limiting the forward and rearward movement of the seat adjuster.

The lower seat frame is supported at its rear end by a foot or support 21 which is fixed to the braces 9 and 11 by the rivet 19. The top 22 of the foot or support 21 provides a track upon which the rear slide plate 4 slides. The lower seat frame is pivotally mounted at its forward end upon the floor of the vehicle body. To this end the ends of the front brace 10 are turned downwardly to form the ears 23. Each of the ears 23 is pivotally connected by a pin 24 to an L shaped bracket 25 which is secured by screws or otherwise fixed to the floor of the vehicle body.

The rack portion of the rack brace 11, as shown in Figure 6, is curved along an arc of a true circle concentric with the arcuate bottom portions 7 of the plates 3 and 4 to insure latching engagement between the pawl 14 and the notches 13 in whatever position the seat is adjusted.

From the above description it will be noted that whenever the seat is tilted forwardly about the pins 24 to the dotted line position shown in Figure 1 to facilitate entry and exit of rear seat passengers that both the upper and lower portions of the seat adjuster swing upwardly with the seat bottom thus leaving a clear and unobstructed pathway for the passengers.

Figure 2:
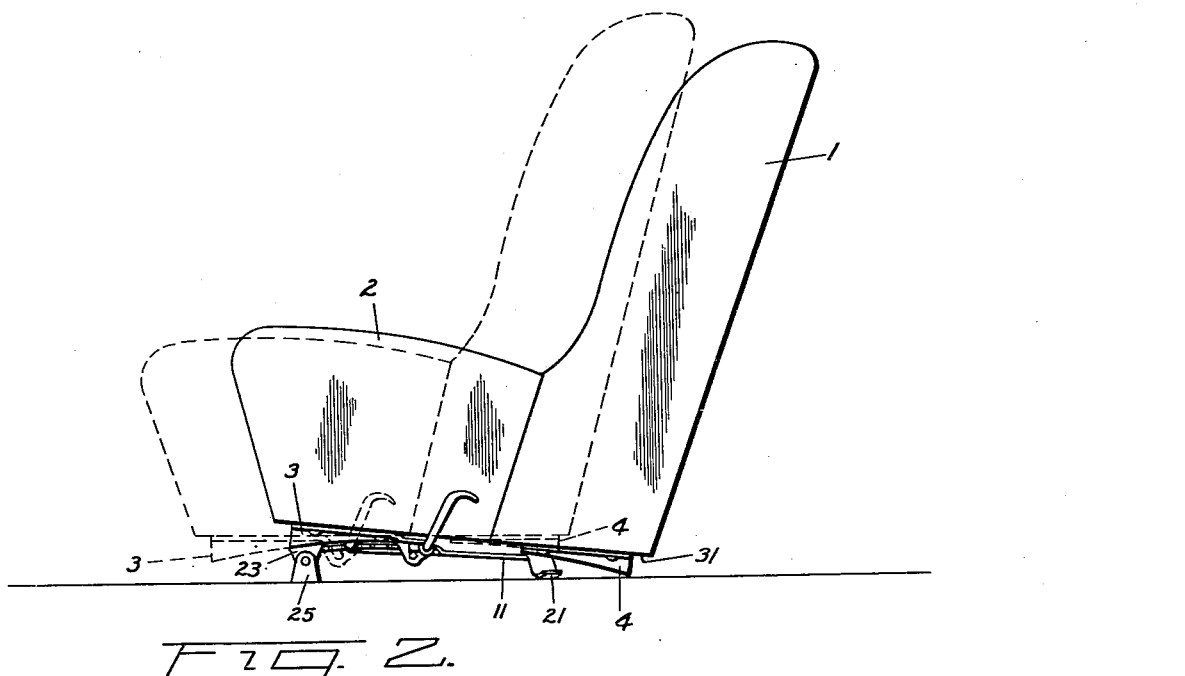
Fig. 2 is a side elevation of the seat and seat adjuster, a second position of the seat being shown in phantom lines.

In adjusting the seat, upon the disengaging of the pawl 14 from any one of the notches 13, the seat may be moved either rearwardly or forwardly. As shown in the full lines of Figure 2, the seat is in its rearmost position. Upon moving the seat forwardly it will be noted that owing to the arcuate form of the slide channel bottoms 7 that the seat travels about the arc of a true circle. This in the forward movement of the seat causes the front portion of the seat cushion to lower, the rear portion to rise, and the seat back to move toward the vertical. Upon rearward adjustment of the seat the opposite takes place; namely, the front of the seat cushion is raised, the rear portion lowered and the seat back thrown rearwardly or tilted away from the vertical.

As the seat moves forwardly, owing to the mounting of the plates 3, the seat bottom 31 moves closer to the front brace 11. As the rivets 18 and 20 travel from the front toward the rear end of the slots 8 in the plates 3, the front portion of the seat bottom and cushion is lowered. Further, during the forward movement of the seat, as the rear slide 4 travels along the rivet 19, the seat bottom 31 is raised because the arcuate wall 7 of the rear slide 4 recedes from the seat bottom 31 from front to rear. Thus in the forward movement of the seat adjuster the rear slide plate 4 raises the rear portion of the seat.

Figure 7:
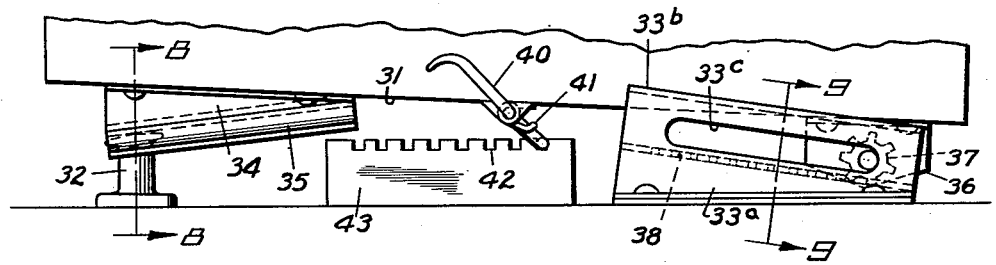
Fig. 7 shows a modified form in which the seat cannot be swung up or down.
Figure 8:
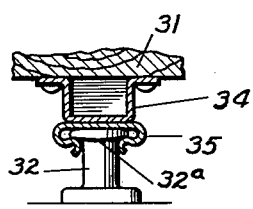
Fig. 8 is a section on line 8—8 of Fig. 7.
Figure 9:
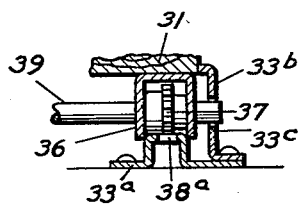
Fig. 9 is a section on the line 9—9 of Fig. 7.
Figure 10:
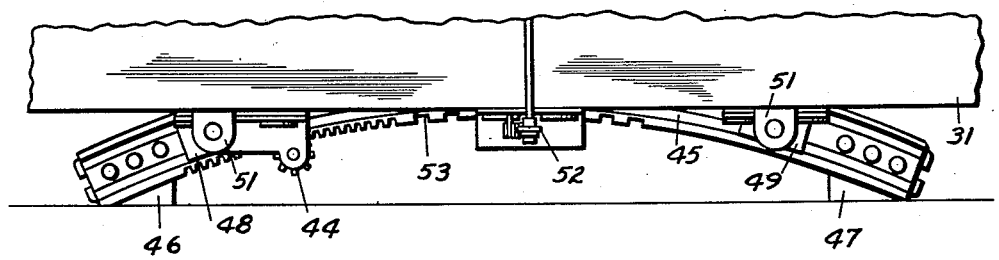
Fig. 10 is a side elevation of still another modified form.

Turning to Figures 7–14, two modified forms of seat adjusters are shown but both of the same general class as the one just described. In the one shown in Figures 7–9, the seat cannot be swung up but is permanently supported on the floor by the front support 32 and the rear support 33. At the front, the bracket 34 has a spring lip saddle 35 (Figure 8) which straddles the short I-section track 32a on the support 32. At the rear, the support 33 is made up of the track 33a (Figure 9) and the slotted guide 33b provided with longitudinal slot 33c (Figure 7). A bracket 36 secured to the seat bottom 31 journals the spur gear 37 which is arranged to travel in notches 38 of the track 33a. The gear 37 at the opposite side is connected by a shaft 39 which serves to equalize the travel on both sides. This is shown for the third form of the device in Figure 12.

40 is a detent lever controlled by spring 41 and having a portion adapted to engage in the notches 42 of the locking bar 43 to hold the seat in any one of the several adjusted positions. It will readily be understood that when the detent lever is depressed at its upper end, it will release the seat and the seat can be shoved forward or rearwardly provided it is not at the limit of its movement.

Figure 11:
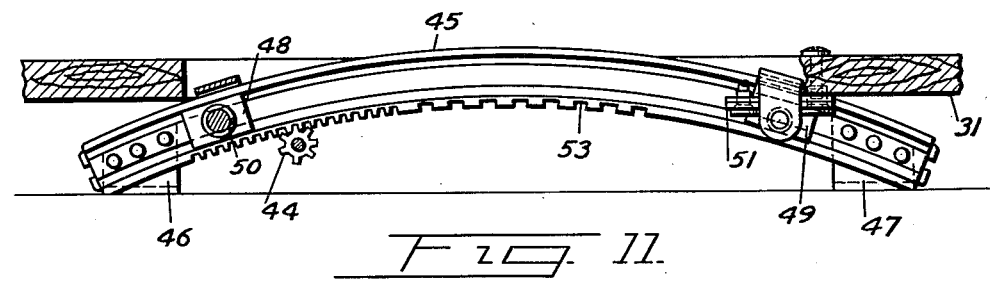
Fig. 11 is another side elevation of the same with some of the parts omitted or broken away.

In Figures 10–14, the equalizing gear is designated 44. A permanent segmental track 45 is supported at the front by bracket 46 and at the rear by bracket 47. Slides 48 and 49 engage the segmental track 45 as shown in Figs. 11 and 13. They are pressed in engagement by the coiled spring 50 which abuts against the bracket 51 secured to the seat bottom. A detent lever 52 is pivotally supported and has a nose that is arranged to engage in the notches 53 in the lower edge of the track 45.

When the travel is on an arc as in the devices shown in Figs. 3–6 and 10–14, there is less binding or jamming possible than where the movement is on two flat inclined planes as shown in Figure 7.

We are aware that it is old to provide a seat adjuster in which the seat throws forward and downwardly on a pivoted link. However, such a seat is very difficult to adjust to intermediate positions for the reason that as soon as the top of the link throws over a vertical center line through the bottom pivot point of the link, the seat immediately tends to throw forward to the limit of its movement. In fact, it is almost impossible to arrest it from making such a full movement when one is occupying the seat. With the improved construction here described, there is no such tendency and the seat may be easily arrested at any desired intermediate position.

In the form of the invention shown in Figs. 15 through 18 the bottom seat frame 60 is supported on four slides 61. Each slide 61 is secured to the seat bottom by a screw 62 and has an arcuate slide portion 63 which slidably engages the arc type of track 64 which has its ends bolted to the floor of the body. Each arc track 64 in section is an inverted channel. Each slide 61 is provided with a tie-down bracket 65 which is secured to the slide by the bolt 66 and slidably engages the bottom face of the track 64. The seat bottom 60 supports a latch 67 which engages any one of a plurality of notches 68 in the track member 64 to hold the seat in adjusted position.

What we claim is:

1. A vehicle seat adjuster, having in combination, brackets securable to the seat bottom at front and rear thereof and floor supports interengaging with the seat bottom brackets, the bracket and support set at the rear arranged to slidably interengage on surfaces so inclined that the seat bracket climbs and elevates on the floor support as it travels forward relatively to the floor support and the front set of brackets and supports slidably bound together and arranged on surfaces so inclined that the seat bracket travels downwardly and descends as the bracket slides forwardly relative to the floor support, the bracket and the support at the front being in the form of an I section short rail engaged by a spring saddle on the seat bracket.

2. A vehicle seat adjuster, having in combination, brackets securable to the seat bottom at front and rear thereof and floor supports interengaging with the seat bottom brackets, the bracket and support set at the rear arranged to slidably interengage on surfaces so inclined that the seat bracket climbs and elevates on the floor support as it travels forward relatively to the floor support and the front bracket and support set slidably tied together and arranged on surfaces so inclined that the seat bracket travels downwardly and descends as the bracket slides forwardly relative to the floor support, the bracket and floor support set at the rear being in the form of a notched track and a slotted guide for the floor support and a bracket securable to the seat bottom journaling an equalizing gear whose teeth engage in the notches of the track.

3. A vehicle seat adjuster having in combination, brackets securable to the seat bottom at front and rear thereof and floor supports interengaging with the seat bottom brackets, the bracket and support at the rear arranged to slidably interengage on surfaces so inclined that the seat bracket climbs and elevates on the floor support as it travels forward relatively to the floor support and the front set of brackets and supports slidably engaging and arranged on surfaces so inclined that the seat bracket travels downwardly and descends as the bracket slides forwardly relative to the floor support, the bracket and the support being in the form at the front of an I section short rail engaged by a spring saddle on the seat bracket, the bracket and floor support set in the rear being in the form of a notched track and a slotted guide for the floor support and a bracket securable to the seat bottom journaling an equalizing gear whose teeth engage in the notches of the track.

EMORY GLENN SIMPSON.
EDWIN L. GRAF.